Feb. 1, 1949.　　　　　E. H. KIDD　　　　　2,460,754
HEAT EXCHANGER
Filed July 5, 1946　　　　　　　　　　　　　2 Sheets-Sheet 1
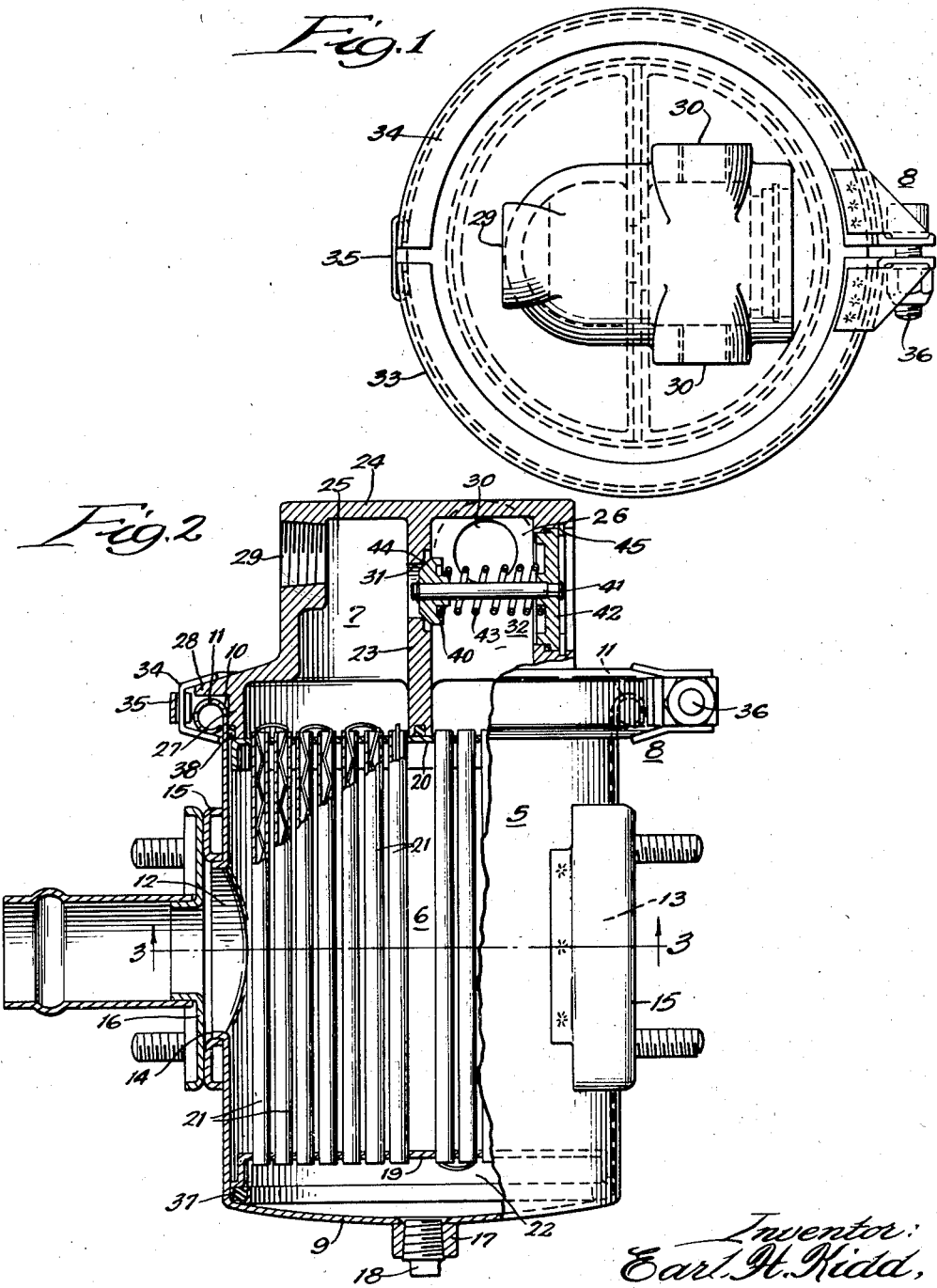
Inventor:
Earl H. Kidd,
By Soans Pond & Henderson
Attorneys.

Feb. 1, 1949.    E. H. KIDD    2,460,754
HEAT EXCHANGER
Filed July 5, 1946    2 Sheets-Sheet 2
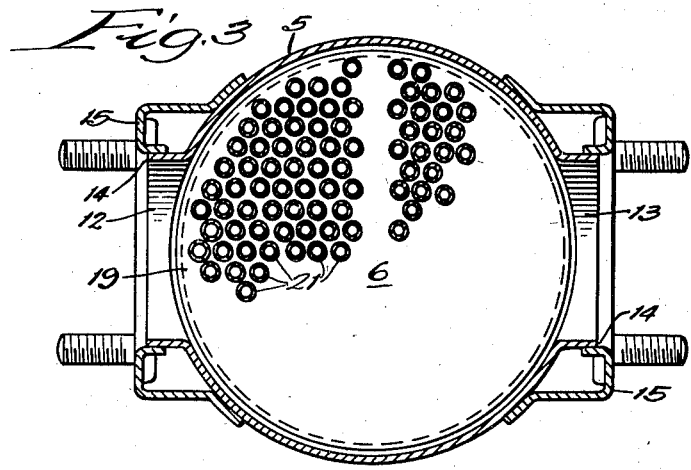
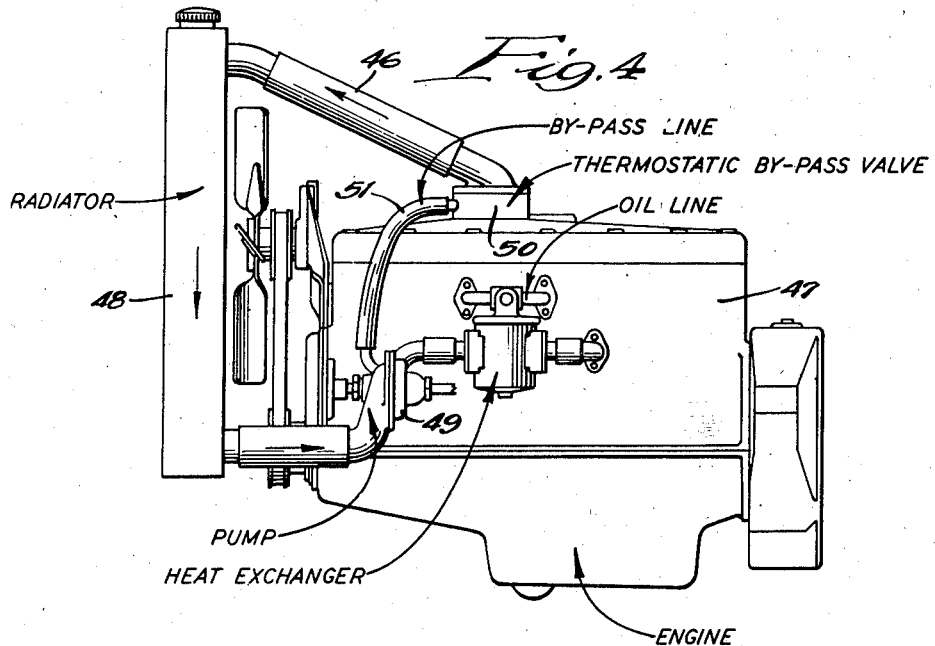
Inventor:
Earl H. Kidd,
By Sloane, Pond & Henderson
Attorneys.

Patented Feb. 1, 1949

2,460,754

UNITED STATES PATENT OFFICE 2,460,754

HEAT EXCHANGER

Earl H. Kidd, Racine, Wis., assignor to Young Radiator Company, Racine, Wis., a corporation of Wisconsin Application July 5, 1946, Serial No. 681,548

2 Claims. (Cl. 257—2)

Regulating the temperature of oil for lubricating the moving parts of heat-generating power units has become an increasing imperative with the expanding development and application of such power units. This expanding use of such power units in the automotive field has presented problems peculiar to the particular types of service in which the vehicles are employed.

Power units for mobile equipment generally employed in cruising, such as police squad cars traveling most of the time at from 10 to 15 miles per hour, normally do not generate enough heat to keep the lubricating oil at temperatures needed for the most efficient operation of such units. Especially has this been found true in cold weather and climates. Those charged with the maintenance of such equipment have resorted to crank-case covers or special radiator cores located in the crank case. Certain car manufacturers have sought to overcome this deficiency for units used in this type of service by providing additional or special accessories.

On the other hand, power units used for cross-country buses present the paradox of at times operating at full-load capacity and at other times requiring a very minimum of power. During the one condition considerable cooling of the oil is demanded; during the other condition oil warming is imperative.

Power units required for cross-country heavy-duty trucks, especially those operating in the cooler months or climates, and power units for light-duty trucks used in cities present contrary problems of oil warming and oil cooling.

Power units used on heavy earth-moving machinery present the problem of normally insufficient oil cooling due to the excess dust in the air which is depended upon to cool the oil.

For certain of these latter problems one engine manufacturer has resorted to the expediency of a special liquid-to-liquid heat exchanger for oil cooling. Another engine manufacturer provides an auxiliary oil-to-water heat exchanger mounted on the outside of the engine instead of being an integral part of the normal equipment and placed inside of the unit. None of these expedients is available to solve all of the different problems presented by these various types of vehicles. No one appears to have provided a heat exchanger capable of application to all of such a variety of situations.

The main objects of this invention, therefore, are to provide an improved form of heat-exchange device the parts of which are so formed and fabricated as to provide a very compact heat exchanger with an extensive intimate heat-exchange contact between the two differently temperatured fluids flowing through the device; to provide an improved heat-exchange device of this kind which can be inserted in the fluid cooling circuit for power units and serve to warm or cool the lubricating oil as the differing conditions created by the varied types of automotive equipment or the service, in which such power units are used, may require; to provide a heat-exchange device of this kind wherein the several parts are so constructed as to make an initial assembly very simple and certain and make subsequent dismantling for cleaning and repair and reassembling equally simple and certain; and to provide a heat-exchange device of this kind which is so compact and confined in its over-all dimensions as to require a very minimum of space for installation, thereby making practical the inclusion of such a device in automotive equipment by the manufacturer or its subsequent insertion of such a device by the purchaser of the equipment.

A preferred embodiment of this invention is shown in the drawings wherein:

Fig. 1 is a plan view of a heat-exchange device constructed in accordance with this invention;

Fig. 2 is a vertical partly-sectional and partly-elevational view of the same;

Fig. 3 is a transverse sectional view taken on the line 3—3 of Fig. 2; and

Fig. 4 is a diagrammatic view of a power unit and its cooling system showing a heat exchanger embodying this invention incorporated therewith.

A heat-exchange device constructed in accordance with this invention comprises a shell 5 wherein is mounted a core 6 held in place by a closure 7 through the medium of clamping means 8.

The shell 5 is preferably a sheet-metal stamping of cylindrical form with an integral closed end 9 and an opposite open end 10. At the latter end the perimetrical portion of the shell is curled inwardly to form a rim 11. Openings are cut in the sides of the shell to form inlet and outlet ports 12 and 13. The metal around the perimeters of these openings is upset to form transversely-disposed flanges 14 around which are secured plates 15 adapted for the mounting of connector means 16. A nipple 17 is brazed on the bottom 9 providing a drain opening normally closed by a plug 18.

The core 6 comprises a pair of header plates 19 and 20 supported in spaced relationship by a plurality of axially-disposed, radially-spaced tubes 21 and so assembled as to fit within the shell 5.

The headers 19 and 20 are sheet metal stampings of pan-like form each with a transverse perimetrical flange. The flange on the plate 19 supports the plate in spaced relationship to the bottom 9, thus providing a chamber 22 which communicates with all of the tubes 21.

The tubes 21 are of the conventional type used in heat-exchange devices of this kind, and have their ends extended through and sealed in the header plates 19 and 20. Agitators may be inserted in the tubes 21 to increase the heat-transfer surface exposed to the fluid flowing through the tubes.

The closure 7 is herein shown in the form of a casting. A transverse, axial partition 23 divides an integral head 24, formed on the closure 7, into chambers 25 and 26. Angularly-disposed perimetrical flanges 27 and 28, respectively, secure the core 6 in the shell 5 and support the closure on the open end of said shell.

The partition 23 contacts the header plate 20 diametrically thereof and divides the tubes 21 of the core 6 into two groups communicating respectively with the chambers 25 and 26.

An inlet port 29 and a pair of outlet ports 30 are formed in the closure head 24 to communicate respectively with the chambers 25 and 26. An opening 31 is formed in the partition 23 to provide communication between the chambers 25 and 26 under the control of a valve mechanism 32 as will appear more fully hereinafter.

The clamping means 8 is herein shown in the form of a pair of arcuate, channel-shaped sections 33 and 34. These sections are hingedly connected together at one of their ends by means of a link 35 and at their other end by a bolt and nut connection 36 thus forming a ring. Fitting over the rim 11 on the shell 5 and the flange 27 on the closure 7, the turning up of the connection 36 causes the channel-shaped members 33 and 34 to force the flange on the header plate 19 into contact with a sealing ring 37 and to compress a sealing ring 38 into the space between the perimeter of the header plate 20 and the adjacent wall of the shell 6. These sealing rings 37 and 38 prevent communication between the space within the shell 5 surrounding the tubes 21 and the chambers 22, 25, and 26 communicating with the tubes 21.

The valve mechanism 32 may be either of the spring-loaded type, to be actuated by the pressure of the fluid in the device, or the thermostatic type, to be actuated by the temperature of the fluid flowing through the chambers 25 and 26. As shown herein, the valve mechanism 32 is of the former type. The valve member 40 is slidably mounted on a stem 41 secured to a cover plate 42 and urged by a spring 43 to normally be seated on a valve seat 44 so as to control communication through the opening 31 in the partition 23. The cover plate 42 is held in place by means of a special spring retaining-ring 45 of the type shown in Fig. 5 of co-pending application Serial No. 598,535, filed June 9, 1945, now Patent No. 2,444,711, dated July 6, 1948.

If at any time the condition of the fluid in the tubes 21 is such that the pressure required, to cause a flow of fluid from the chamber 25 to the chamber 26 through the tubes 21 and the communicating member 22, is more than that to which the tubes 21 should be subjected, the valve 40 will recede from its valve seat 41 and permit a flow of fluid directly from the inlet 29 to the outlets 30.

The spring 43 is tensioned so that in the event the congealed condition of oil in the core 6 is such as to create a pressure on the tubes 21 in excess of their rated pressure resistance, the valve mechanism 32 would open to allow the oil to flow directly from the chamber 25 to the chamber 26, thereby by-passing the core tubes 21.

The manner in which a heat exchanger of this kind is used with a power unit is shown in Fig. 4. The heat-exchange device is mounted on or adjacent to a power unit 47 with the ports 12 and 13 connected in the line 46 between the power unit 47 and the radiator 48, preferably between the pump 49 and the jacket of the power unit 47. To the oil inlet 29 and the outlets 30 are connected an oil line to the power unit. A suitable thermostatic valve 50 is arranged in the line 46 from which valve leads a by-pass 51 to the line connection to the inlet port 12 of the heat-exchange device.

During the warm-up period of the power unit the coolant will be circulated through the jacket and the heat exchanger by-passing the radiator 48. As the temperature of the coolant rises its flow through the heat exchanger will quickly warm the oil in the core 6. The valve mechanism 32, unless the oil in the core is excessively congealed, will cause the oil to flow through the tubes 21. Here the oil will quickly pick up the heat from the coolant and establish a temperature therefor suitable for the efficient operation of the power unit.

During normal operation of the power unit 47, the oil flowing through the heat-exchange core 6 will take up heat from or give off heat to the coolant flowing around the tubes 21 from the radiator 48. Thus the oil will be kept near a temperature most efficient for the operation of the power unit 47 regardless of the conditions of service to which it may be subjected.

Variations and modifications in the details of structure and arrangement of the parts may be resorted to within the spirit and coverage of the appended claims.

I claim:

1. In a device of the class described, the combination of a one-piece shell closed at one end and having the perimetrical portion of the open end formed to provide an annular ledge and having inlet and outlet ports formed in the sides thereof, a core for said shell comprising a pair of header plates held in axially-spaced relationship a distance less than the internal axial length of said shell by a plurality of axially-disposed radially-spaced tubes the ends of which tubes extend through and are bonded to the respective header plates, said core being adapted to telescopically fit within said shell with the one header spaced from the closed end of said shell to form a chamber communicating with all of said tubes, a closure for the open end of said shell formed with axially- and radially-disposed peripheral flanges the former of which is adapted to telescopically fit within the open end of said shell with the radially-disposed flange resting on the peripheral ledge of said shell, said closure having the interior divided into two compartments by an axially-disposed partition the lower end of which is disposed in the plane of the lower edge of said axially-disposed peripheral flange, said closure also having inlet and outlet ports communicating with the respective closure compartments, valve mechanism located in said partition and operable under the influence of fluid entering said closure inlet port for controlling communication directly between said closure compartments or indirectly through said core, and clamping means gripping the superimposed closure flange and shell ledge whereby to press said lower edges of said axially-disposed closure flange and partition against the upper of said header plates and thereby force the lower of said header plates into contact with said shell bottom to seal off communication between the chambers of said shell on the opposite sides of said lower header.

2. In a device of the class described, the combination of a one-piece shell closed at one end and having the perimetrical portion of the open end formed to provide an annular ledge and having inlet and outlet ports formed in the sides thereof, a core for said shell comprising a pair of header plates peripherally flanged to telescopically fit within said shell, said header plates being held in axially-spaced relationship a distance less than the internal axial length of said shell by a plurality of axially-disposed radially-spaced tubes the ends of which tubes extend through and are bonded to the respective header plates, said core being adapted to telescopically fit within said shell with the flange on the inner header spacing said header from the closed end of said shell to form a chamber communicating with all of said tubes, a closure for the open end of said shell formed with axially- and radially-disposed peripheral flanges the former of which is adapted to telescopically fit within the open end of said shell with the radially-disposed flange resting on the peripheral ledge of said shell, said closure having the interior divided into two compartments by an axially-disposed partition the lower end of which is disposed in the plane of the lower edge of said axially-disposed peripheral flange, said closure also having inlet and outlet ports communicating with the respective closure compartments, valve mechanism located in said partition and operable under the influence of fluid entering said closure inlet port for controlling communication directly between said closure compartments or indirectly through said core, clamping means gripping the superimposed closure flange and shell ledge whereby to press said lower edges of said axially-disposed closure flange and partition against the upper of said header plates and thereby force the flange on the lower of said header plates into contact with said shell bottom to seal off communication between the chambers of said shell on the opposite sides of said lower header, and compressible sealing strips inserted in the edges of said axially-disposed closure flange and said partition and between the lower edge of the flange on the inner of said header plates and said shell end.

EARL H. KIDD.

REFERENCES CITED

The following references are of record in the file of this patent:

UNITED STATES PATENTS

| Number | Name | Date |
|---|---|---|
| 1,662,615 | McNeal | Mar. 13, 1928 |
| 1,822,698 | How | Sept. 8, 1931 |
| 2,289,097 | Brinen | July 7, 1942 |

FOREIGN PATENTS

| Number | Country | Date |
|---|---|---|
| 310,157 | Great Britain | Apr. 25, 1929 |